(12) United States Patent
Ramaswamy et al.

(10) Patent No.: US 9,082,271 B2
(45) Date of Patent: Jul. 14, 2015

(54) CUSTOMIZED AUDIO ALERTS

(71) Applicant: TATA CONSULTANCY SERVICES LIMITED, Mumbai, Maharashtra (IN)

(72) Inventors: Satyanarayanan Ramaswamy, Santa Clara, CA (US); Vadrevu Girija Shankar, Hyderabad (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 13/684,420

(22) Filed: Nov. 23, 2012

(65) Prior Publication Data

US 2014/0062697 A1   Mar. 6, 2014

(30) Foreign Application Priority Data

Aug. 31, 2012   (IN) .......................... 2548/MUM/2012

(51) Int. Cl.
| | |
|---|---|
| *G08B 21/00* | (2006.01) |
| *G08B 3/10* | (2006.01) |
| *H04M 1/57* | (2006.01) |
| *H04M 1/725* | (2006.01) |
| *H04M 19/04* | (2006.01) |
| *H04L 12/58* | (2006.01) |

(52) U.S. Cl.
CPC *G08B 3/10* (2013.01); *H04L 51/24* (2013.01); *H04M 1/57* (2013.01); *H04M 1/72552* (2013.01); *H04M 1/72563* (2013.01); *H04M 19/04* (2013.01)

(58) Field of Classification Search
CPC ............. H04W 68/00; H04N 21/4882; H04M 11/022; H04M 2250/00; H04M 1/00
USPC ................. 340/384.1, 540, 502, 539.11, 328, 340/309.16; 379/373.02, 67.1; 455/415, 455/567
See application file for complete search history.

(56) References Cited

U.S. PATENT DOCUMENTS

| | | | | |
|---|---|---|---|---|
| 5,845,219 | A * | 12/1998 | Henriksson | .................... 455/567 |
| 5,870,684 | A * | 2/1999 | Hoashi et al. | ................. 455/567 |
| 6,757,534 | B2 * | 6/2004 | Bach et al. | ..................... 455/417 |
| 7,558,384 | B2 * | 7/2009 | Tischer | ..................... 379/373.02 |
| 7,567,860 | B2 * | 7/2009 | Tischer | ..................... 340/539.13 |
| 8,065,027 | B2 | 11/2011 | Tischer | |
| 2004/0223605 | A1 * | 11/2004 | Donnelly | ................. 379/373.01 |
| 2007/0293204 | A1 * | 12/2007 | Henderson | ..................... 455/415 |

OTHER PUBLICATIONS

Pressnell: "eNotify" Application; Verietas Software, 2011—iTunes Preview, https://itunes.apple.com/in/app/enotify/id429751714?mt=8, 3pages.

* cited by examiner

*Primary Examiner* — Phung Nguyen
(74) *Attorney, Agent, or Firm* — Hamre, Schumann Mueller & Larson, P.C.

(57) ABSTRACT

A methods and systems for generating customized audio alerts are described. The method includes identifying occurrence of an event on a communication device. The event is associated with at least one attributes. The at least one attribute associated with the event is compared with user-defined attributes. Further, a customized audio alert is generated on the communication device based on the comparing.

12 Claims, 3 Drawing Sheets

1

CUSTOMIZED AUDIO ALERTS

TECHNICAL FIELD

The present subject matter, in general, relates to generating customized audio alerts, and in particular, to systems and methods of generating customized audio alerts in communication devices.

BACKGROUND

Communication devices, such as mobile phones and tablets provide various features to users. For example, a user may send and receive e-mails through his communication device or a user may set event reminders on the communication device. On occurrence of such events, the communication device may generate audio alerts to inform the user about the occurrence of the events or that certain actions may be due from the user's end. In the given example, an audio alert is generated for each of the e-mails received and event reminders on the communication device. In case, the user receives too many e-mails, he may find the generation of the audio alerts annoying. For example, if the user is expecting an important mail from a particular sender, then the user has to check the communication device every time when the audio alert is generated for received e-mail or the event reminder. In such cases, the user is not able to make out whether the e-mail is from the particular sender or not without attending to the communication device. On the other hand, if the user decides to mute the communication device to stop the audio alerts, then the user may miss important e-mails and event reminders.

Further, the user may also miss the audio alert generated for the important e-mail or event reminder if the user chooses to reduce the volume of the audio alert due to noises from various sources in vicinity of the communication device. For example, if the user is in a crowded market, then the user may miss the audio alert generated due to less volume of the audio alert in comparison to the noises in the crowded market. Also, if the user is proximity of the communication device when the audio alert is generated, then also he may miss the audio alert generated.

SUMMARY

This summary is provided to introduce concepts related to methods and systems for generating audio alerts and the concepts are further described below in the detailed description. This summary is not intended to identify essential features of the claimed subject matter nor is it intended for use in determining or limiting the scope of the claimed subject matter.

In one embodiment, methods and systems for generating customized audio alerts are described. The method includes identifying occurrence of an event on the communication device. The event is associated with least one attributes. The at least one attribute associated with the event is compared with user-defined attributes. Further, a customized audio alert is generated on the communication device based on the comparing.

BRIEF DESCRIPTION OF THE DRAWINGS

The detailed description is described with reference to the accompanying figure(s). In the figure(s), the left-most digit(s) of a reference number identifies the figure in which the reference number first appears. The use of the same reference number in different figure(s) indicates similar or identical items. The features, aspects and advantages of the subject matter will be better understood with regard to the following description, and the accompanying drawings.

Figure 1:
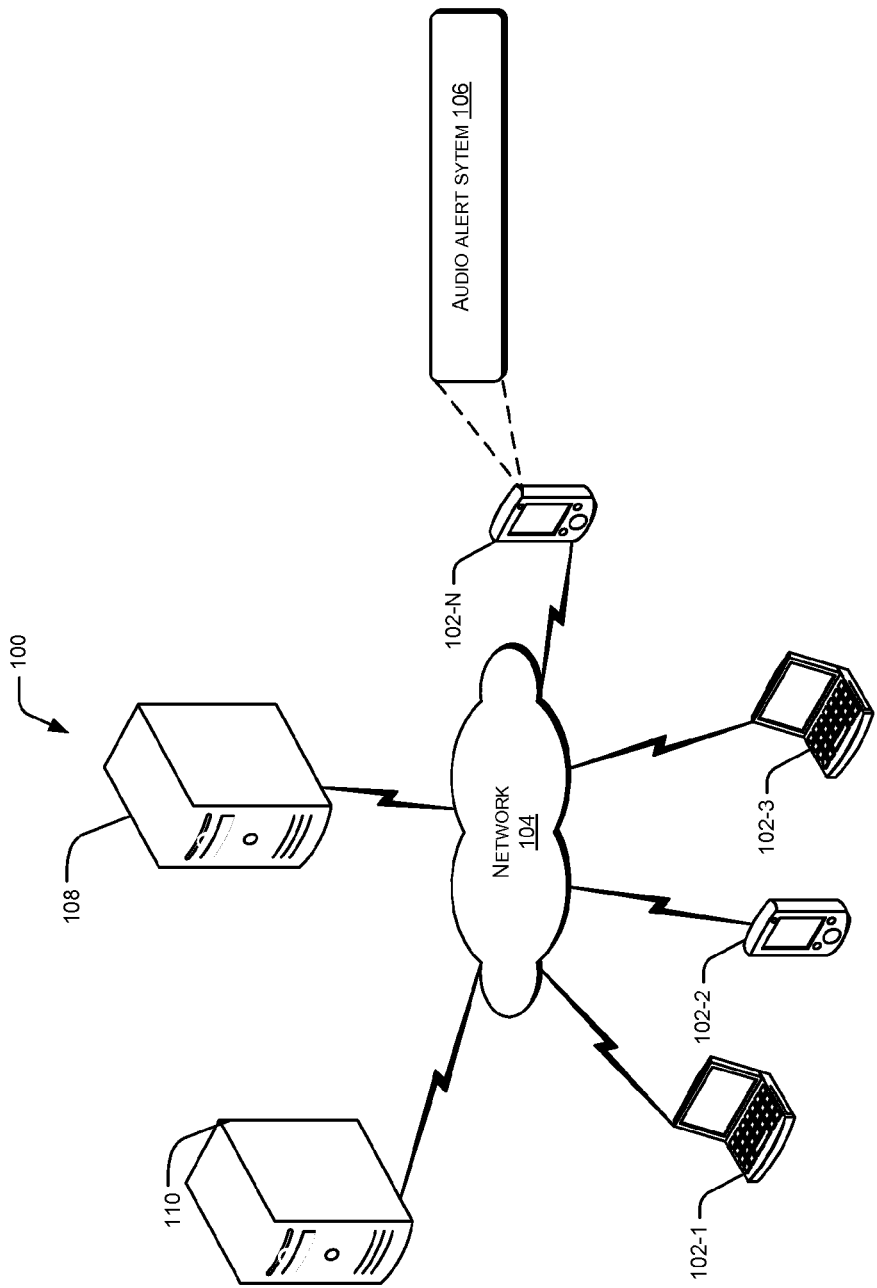
FIG. 1 illustrates a network environment implementing an audio alert system, in accordance with an embodiment of the present subject matter.

It should be appreciated by those skilled in the art that any block diagrams herein represent conceptual views of illustrative audio alert generation system embodying the principles of the present subject matter.

DETAILED DESCRIPTION

Upon occurrence of any event on a communication device, for example, when a user receives an e-mail, an update on any of the applications installed in the communication device or event reminders on the communication device, an audio alert is generated for each such event. After hearing the audio alerts, the user may check the communication device. Thus the audio alerts serve to notify users of occurrence of an event and draw their attention to the same.

Since typically an audio alert is generated for every event, often the alerts tend to cause annoyance to the users, especially in cases where a user is involved in some work that needs his attention without any undesirable distraction. For example, consider a user of communication device receiving numerous alerts due to receipt of e-mails. To ascertain which of the several emails are important, the user must see the communication device every time when the audio alert is generated. If the user receives a large number of e-mails, then it may become too tedious for the user to continuously check the communication device and the user may find it difficult to distinguish the important e-mails and from other e-mails which are not that important to the user. In an example, an e-mail from the office may be an important e-mail for the user in comparison to an e-mail related to some advertisement.

In one conventional approach, an audio alert system is used for generating customized audio alerts on receiving e-mails and event reminders on the communication device. For example, the audio alert system allows the user to assign different audio tones to the e-mails received and to the event reminders on the communication. This helps the user to distinguish the important e-mails and the event reminders from the other e-mails and the event reminders. But with the audio alert system, it may not be possible to distinguish the important e-mails and the event reminders when the user has kept the communication device in mute.

In another conventional approach, the audio alert system allows the user to assign the audio tone to a particular e-mail or event reminder based on rules. The rules may include various criterions to differentiate one e-mail or event reminder from another e-mail or event reminder. The audio alert system does not allow the user to set criterions depending upon his choice. For example, if the user wants to set criteria that the audio alert should be generated when he receives an e-mail which has an attachment, it may not be possible for the user to set these criteria if it is not included in the rules of the audio alert system.

In accordance with the present subject matter, methods and systems for generating customized audio alerts are described. The methods and systems involve generation of customized audio alerts on occurrence of events on a communication device. Although the events occurring on the communication device may be many, such as reception of call, an update on any of the applications installed in the communication device or event reminders, the present description makes references to e-mail and event reminders as events. Accordingly, the events may include receiving an e-mail and an event reminder.

Each of the events has at least one attribute associated with it, such as sender address, sender name in the e-mails, attachment, specific content in subject line, and specific content in body of the e-mails. In one embodiment, the present subject matter allows the user of the communication device to define attributes of an event for generation of audio alerts. The user can hear an audio alert based on the attributes defined by him. For example, the user may define attributes, such as an e-mail with an attachment or an e-mail with an image for the audio alert generation in case of e-mails. Accordingly, the audio alert may be generated only when an e-mail with an attachment or an e-mail with an image is received. The attributes defined by the user are hereinafter referred to as user-defined attributes. Generation of the audio alerts based on user-defined attributes allows a user to customize events for which he wishes to receive notification and avoids a situation where numerous alerts may cause annoyance to him.

On identifying occurrence of the event on the communication device, the attributes of the event are compared with user-defined attributes to determine the attributes match the user-defined attributes. Based on the comparing a customized audio alert is generated on the communication device if the user-defined attributes are met. Customized audio alert may be understood as audio alerts that may be generated based on user-defined attributes. For example, as per user-defined attributes, the user may want to hear the customized audio alert for the e-mail sent from a particular e-mail address. When any e-mail is received, the e-mail address of the sender may be matched to the particular e-mails address as stated in the user-defined attributes. If the particular e-mail address matches with the e-mail address of the sender, then the customized audio alert may be generated on the communication device. On the other hand, if the particular e-mail address does not matches with the e-mail address of the sender, then no audio alert will be generated on the communication device.

In one implementation, the comparison may be performed in the middle-ware server instead of communication devices and a push notification may be sent to the communication devices. The push notification may inform the communication device that whether the customized audio alert is to be generated or not for the event occurred.

In one implementation, the customized audio alert may be configured to override all volume settings of the communication device and the customized audio alert may generated even when the communication device is on mute. This may help in a situation where the user has put the communication device on mute so that the communication device does not generates unnecessary audio alerts, but at the same time he may wish to hear the customized audio alert for certain important events. In one example, a user may put his mobile phone on mute in a meeting, however, at the same time he would want to be alerted if a certain member of his family calls. In another example, a user may put his mobile phone on mute while relaxing at home, but may want to be alerted when ever an e-mail with the word 'urgent' in the subject line is received from his office.

In one implementation, the customized audio alert generated is based on ambient noise of a place where the communication device is being used. First the ambient noise of the place is identified by the communication device and then the customized audio alert may be generated based on the ambient noise. Further, if the user does not acknowledge the customized audio alert at a first instance, the customized audio alert may be repeated with a higher volume than volume of the customized audio alert of the first instance. This cycle may be repeated till the user acknowledges the customized audio alert. In one implementation, the customized audio alert may be generated periodically.

Thus, the systems and the methods in accordance with the present subject matter generates customized audio alert based on the user-defined attributes. This allows the user to eliminate situations where the audio alert is generated for unnecessary events. Therefore, the present subject matter saves a lot of time of the user which was earlier getting wasted in continuous checking of the communication device.

Figure 2:
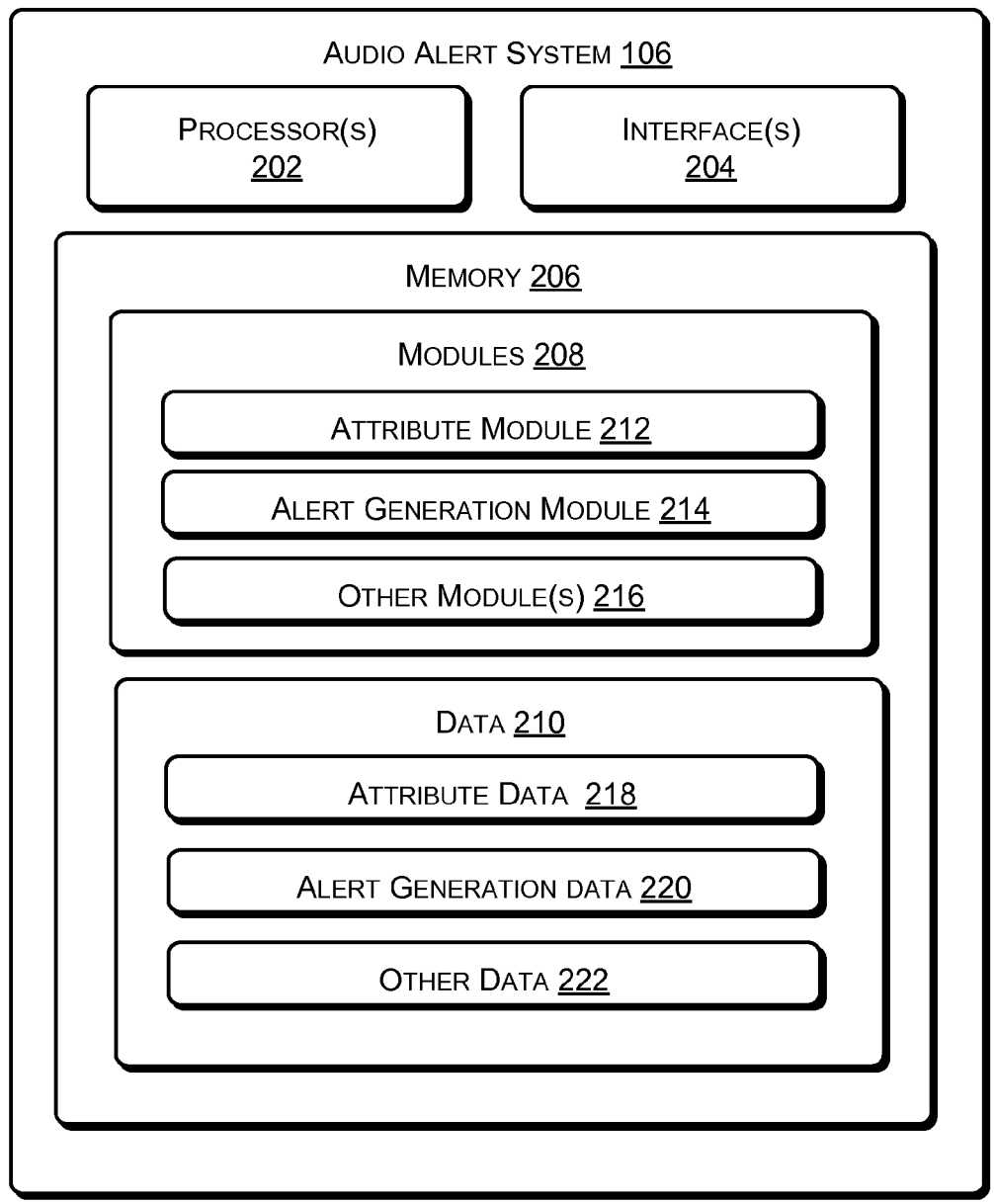
FIG. 2 illustrates components of the audio alert system, in accordance with an embodiment of the present subject matter.
Figure 3:
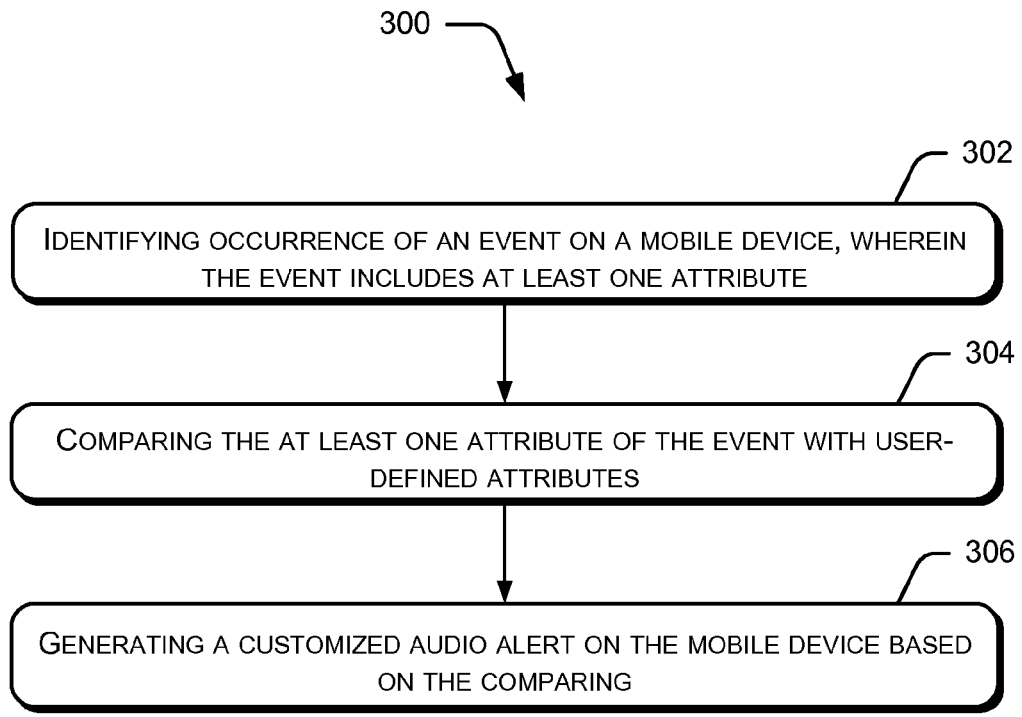
FIG. 3 illustrates a method for generating customized audio alerts on a communication device, in accordance with an embodiment of the present subject matter.

The manner in which the customized audio alerts are generated shall be explained in detail with respect to the FIGS. 1-3. While aspects of systems and methods can be implemented in any number of different computing systems environments, and/or configurations, the embodiments are described in the context of the following exemplary system architecture(s). Furthermore, the present description has been provided with implementations that are specific to certain events, such e-mail and event reminders. It would be appreciated that other implementations are also covered without deviating from the scope of the present subject matter.

FIG. 1 illustrates a network environment 100 implementing an audio alert system, in accordance with an embodiment of the present subject matter. In one implementation, the network environment 100 can be a public network environment, including thousands of personal computers, laptops, various servers, such as blade servers, and other computing devices. In another implementation, the network environment 100 can be a private network environment with a limited number of personal computers, servers, laptops, and other computing devices.

Further, in the network environment 100 a plurality of communication devices 102-1, 102-2 . . . 102-N, collectively referred to as the communication devices 102 and individually referred to as a communication device 102, through a network 104. In one implementation, one of the communication devices 102, such as mobile phones and tablets may have an audio alert system 106, hereinafter referred to as system 106. Although FIG. 1 depicts that the system 106 is configured in one of the communication devices, it may be understood that other communication devices 102 may also have the system 106 configured in them. The system 106 may generate a customized audio alert on occurrence of an event on the communication device 102. The event may include as reception of call, an update on any of the applications installed in the communication device or event reminders. The present description makes references to e-mail and event reminders as events.

In one implementation, the system 106 configured in the communication devices 102 may communicate to a mail server 108 and to a middle-ware server 110 over the network 104 through one or more communication links. The communication links among the mail server 108, the middle-ware server 110, and the system 106 are enabled through a desired form of communication, for example, via dial-up modem connections, cable links, digital subscriber lines (DSL), wireless or satellite links, or any other suitable form of communication.

The mail server 108 may be defined as a server which may act as an agent for sending and receiving e-mails. The mail server 108 routes the e-mails from a source destination to a target destination. For example, the mail server 108 may be dominos mail server. When an e-mail is received in the mail server 108, an agent of a user, i.e., communication devices 102, to whom the mail is to be sent, may inform the middle-ware server 110 about receipt of the e-mail. In the middle-ware server 110, the system 106 may identify whether the user is using an application related to the event or not. When the application is running on the communication device 102, the application is in an active state. On the other hand, when the application user is not running of the communication device, the application is in an in-active state. In an example, when the user is using a mail application for sending mails, the mail application is in the active state.

The network 104 may be a wireless network, a wired network, or a combination thereof. The network 104 can also be an individual network or a collection of many such individual networks, interconnected with each other and functioning as a single large network, e.g., the Internet or an intranet. The network 104 can be implemented as one of the different types of networks, such as intranet, local area network (LAN), wide area network (WAN), the internet, and such. The network 104 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. Further, the network 104 may include network devices, such as network switches, hubs, routers, for providing a link among the mail server 108, the middle-ware server 110, and the system 106 configured in the communication devices 102. The network devices within the network 104 may interact with the mail server 108, the middle-ware server 110, and the system 106 through the communication links.

In one implementation, the system 106 may identify whether an event has occurred or not. The event may include receiving e-mails and event reminder on the communication device 102. The event is associated with at least one attribute defining some characteristic of the event. For example, the at least one attribute may be a sender name, sender address, subject of the e-mail, text in subject and body of the e-mail, and attachment. The system 106 may allow the user to define attributes as per his choice, hereinafter referred to as user-defined attributes.

It may be mentioned that in while in conventional systems, user was bound to select one of the system defined attributes, in the present system, the user can define attributes of his choice and not merely choose a predefined attribute. For example, consider a conventional system that includes several attributes, such as sender name, sender address, subject of the e-mail and text in the e-mail, however, does not include attributes like attachment or 'text in attachment'. In such a case, a user can choose any one of attributes that the system 106 includes. If the user wishes to be alerted only when an e-mail having a certain text in the attachment of the e-mail is received, it may not be feasible for him to do so in the conventional system. This is because the attribute 'text in attachment' is not available in a list of attributes defines in the system. The present system, on the other hand allows the user to define an attribute if it is not included in the list of attributes defines in the system 106. Accordingly, the user may define the attribute 'text in attachment' and be alerted upon receipt of an e-mail having a certain text in the attachment of the e-mail. The process of generation of audio alerts based on user-defined attributes, once the user has defined the attribute is described hereinafter.

Once the occurrence of the event is identified by the system 106, the system 106 may compare the at least one attribute of the event with the user-defined attributes. For example, the user has defined the sender address to be 'abc@xyz.com'. If the sender address of the e-mail is 'abc@xyz.com' which is same as the user-defined attribute, then it can be said that the at least one attribute of the event matches with the user-defined attributes. In an implementation, there may be more than one user-defined attributes which may be further used in comparing. In one implementation, as mentioned above, the comparing is performed by the system 106 configured in the communication device 102. In another implementation, comparing may be performed in the middle ware server 110 instead of the communication device 102.

After comparing, the system 106 may generate a customized audio alert based on the matching. For example, when the at least one attribute is same as the user-defined attributes, the customized audio alert may be generated. In an implementation, when more than one user-defined attributes are compared with the at least one attribute of the event, the customized audio alert may also be generated when only some of the user-defined attributes are same as the at least one attribute. In one embodiment, the customized audio alert may also be generated even when the communication device 102 is on mute. The system 106 generates the customized audio alert which can override volume settings of the communication device 102.

In one embodiment of the present subject matter, the customized audio alert may be generated along with a notification for an application configured on the communication device 102. The application may be an e-mail application for sending and receiving e-mails.

The application may allow the user to send and receive e-mails on the communication device 102 and set event reminders. In one implementation, the system 106 may identify an application state, i.e., whether the application is running of the communication device 102 or not. When the application is running on the communication device, the application state is the active and when the application is not running on the communication device 102, the application state is the in-active.

Any e-mail sent to the communication device 102, is first delivered to the mail server 108. The mail server 108 may route the e-mail to the middle-ware server 110. The mail server 108 may have an agent for each of the users for sending the e-mails. At the middle-ware server 110, the application state of the communication device 102 is identified by the system 106.

In one implementation, when the application state of the communication device 102 is active, the system 106 generates a notification on screen of the communication device 102. The notification may include a text depicting the sender name and subject of the e-mail. The notification is generated for every sender irrespective of the fact that whether the sender is in the user-defined attributes or not. After the notification, the system 106 may compare the at least one attribute of the e-mail with the user-defined attributes. Further, the customized audio alert may be generated based on the comparing of the user-defined attributes. The customized audio alert may be generated for specific senders of the e-mails who meet the criteria of the user-defined attributes.

In another implementation, when the application state of the communication device 102 is inactive, the system 106 may first identify whether the senders of the e-mail meet the criteria set by the user-defined attributes. In other words, it may be identified whether the at least one attribute of the e-mails matches with the user-defined attributes. If the at least one attribute matches with the user-defined attributes, then the customized audio alert may be generated along with a notification for the e-mail.

The customized audio alert may be also heard when the communication device 102 is mute. The customized audio alerts override volume setting of the communication device 102 and allow the user to hear even when the communication device 102 is on mute.

FIG. 2 illustrates components of the system 106, in accordance to an embodiment of the present subject matter. The system 106 includes one or more processor(s) 202, a memory 206 coupled to the processor(s) 202, and interface(s) 204. The processor(s) 202 may be implemented as one or more microprocessors, microcomputers, microcontrollers, digital signal processors, central processing units, state machines, logic circuitries, and/or any devices that manipulate signals based on operational instructions. Among other capabilities, the processor(s) 202 are configured to fetch and execute computer-readable instructions and data stored in the memory 206.

The interface(s) 204 may include a variety of software and hardware interfaces, for example, interface for peripheral device(s), such as a keyboard, a mouse, an external memory, a printer, etc. Further, the interface(s) 204 may enable the system 106 to communicate over the network 104, and may include one or more ports for connecting the system 106 with other computing devices, such as web servers and external databases. The interface(s) 204 may facilitate multiple communications within a wide variety of protocols and networks, such as a network, including wired networks, e.g., LAN, cable, etc., and wireless networks, e.g., WLAN, cellular, satellite, etc.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 also includes modules 208 and data 210.

The modules 208 include routines, programs, objects, components, data structures, etc., which perform particular tasks or implement particular abstract data types. The module(s) 208 further include an attribute module 212, an alert generation module 214, and other module(s) 216. The other module(s) 216 may include programs or coded instructions that supplement applications and functions on the system 106, for example, programs in the operating system.

The data 210, amongst other things, serves as a repository for storing data processed, received, and generated by one or more of the modules 120. The data 210 includes an attribute data 218, an alert generation data 220, and other data 222. The other data 222 may include data generated as a result of the execution of one or more modules in the other module(s) 216.

In operation, the attribute module 212 within the system 106 may allow the user to define one or more attributes of an event based on his choice. Once the one or more attributes are defined for generating a customized audio alert for specific events, the one or more attributes may be stored in the attribute data 218. The event may be receiving an e-mail and event reminder on the communication device 102. The event may include at least one attribute, such as sender name, sender address, text in the e-mail, attachment in the e-mail, and urgency of the e-mail. The attribute module 212 may keep on checking whether any event has occurred or not. When the event occurs, the attribute module 212 may determine the attributes associated with the occurred events and store the at least one attribute of the event in the attribute data 218. For example, the attribute module 212 may monitor whether an e-mail has been received on the communication device 102 or not. When the e-mail is received, the attribute module 212 stores the at least one attribute of the e-mail in the attribute data 218.

Further, the alert generation module 214 may compare the at least one attribute of the event with the one or more attributes defined by the user. If the alert generation module 214 identifies that the at least one attribute matches with the one or more attributes, then the alert generation module 214 may generate the customized audio alert. A notification may also be generated on a screen of the communication device 102 along with the customized audio alert. In case, the at least one attribute does not match with the one or more attribute, the alert generation module 214 may not generate the customized audio alert.

In one implementation, the alert generation module 214 may generate the customized audio alert with a volume depending upon ambient noise. For example, the alert generation module 214 may identify the ambient noise around the communication device 102 and may generate the customized audio alert having substantially high volume than the ambient noise. This may allow the user to hear the customized audio alert in every type of surroundings. For example, if the user is in a market, then the customized audio alert with high volume may be generated so that the customized audio alert is audible to the user. Similarly, if the user is in a meeting, then the customized audio alert having substantially low volume may be generated.

In one implementation, the alert generation module 214 may generate the customized audio alert at all volume settings of the communication device 102 so that the user does not miss the important e-mails and the event reminders even when the communication device 102 is on mute. Further, the alert generation module 214 repeats the generation of the customized audio alert with an increased volume when the customized audio alert is not acknowledged by the user of the communication device 102. In one implementation, the volume of the re-generated customized audio alert may be higher than volume of the previously generated customized audio alert. This may help in a situation where the user was not around the communication device 102 when the important e-mail or event reminder is received on the communication device 102. Therefore, the alert generation module 214 may re-generate the customized audio alert till the user acknowledges the customized audio alert. In one implementation, the alert generation module 214 may also allow the user to select a tone for the customized audio alert.

FIG. 3 illustrates a method 300 of generating customized audio alerts, in accordance with an embodiment of the present subject matter. The method 300 may be described in the general context of computer executable instructions. Generally, the computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the method can be implemented in any suitable hardware, software, firmware, or combination thereof.

At block 302, it is identified whether an event has occurred or not. For example, an e-mail may be received or an event reminder on the communication device 102. In one implementation, the attribute module 212 may identify occurrence of the event. The event may include at least one attribute associated with it. For example, the event may have the at least one attribute, such as sender name, sender address, subject, and text in the e-mail. The user may also define attributes referred to as user-defined attributes. For example, the user-defined attributes may include attribute stating the sender name is 'XYZ', sender address is 'xyz@abc.com', and an attachment with an image.

At block 304, the at least one attribute of the event is compared with the user-defined attributes. In one implementation, the alert generation module 214 compares the at least one attribute of the event with the user-defined attributes in the communication device 102. In another implementation, the alert generation module 214 may compare the at least one attribute of the event with the user-defined attributes in the middle-ware server 110.

At block 306, a customized audio alert is generated on the communication device 102 based on the comparing of the user-defined attributes with the attributes of the occurred event. In one implementation, the alert generation module 214 may generated the customized audio alert for the event, when the at least one attributes of the event matches with the user-defined attributes. In an example, the customized audio alert may be generated when the received e-mail has an attached image of more than 5 Mb (mega bytes) and 'urgent' text in the subject of the e-mail. If one of the user-defined attributes does not match with the at least one attribute, then also the customized audio alert may be generated. In one implementation, the user may decide whether all of the user-defined attributes should match with the at least one attribute of the event or matching of only one user-defined attributes is sufficient for generation of the customized audio alert. The customized audio alert may be heard by the user at all volume settings of the communication device 102. This may avoid situation where the user tends to miss important e-mails and event reminders when the communication device 102 is kept on mute.

The systems and methods of the present subject matter enable generation of the customized audio alerts on the communication device 102 on occurrence of events. The present subject matter generates the customized audio alert only when the event which meets the user-defined attributes criteria occurs on the communication device. Thus, the present subject matter allows a user to keep track of important e-mails and event reminders by generating the customized audio alert for specific e-mails. This helps in preventing situation where the user used to get annoyed with so many audio alerts for every e-mails. Now the user may remain updated with the important e-mails and event reminders through the customized audio alerts generated based on user-defined attributes. Further, the customized audio alert may be played at all volume setting of the communication device, therefore allowing the user to be aware of the important e-mails and the event reminders even when the communication device 102 is on mute.

Although embodiments for systems and methods for generating the customized audio alerts have been described in language specific to structural features and/or methods, it is to be understood that the invention is not necessarily limited to the specific features or methods described. Rather, the specific features and methods are disclosed as exemplary implementations for generating the customized audio alerts.

We claim:

1. A method for generating customized audio alerts on a communication device, the method comprising:
   identifying receiving of an email on the communication device, wherein the email is associated with at least one attribute;
   when an email application state in the communication device is active,
      generating a visual notification on the communication device, wherein the visual notification includes a text depicting email information;
      comparing the at least one attribute associated with the email with user-defined attributes; and
      generating a customized audio alert on the communication device based on the comparing, and
   when the email application state in the communication device is inactive,
      comparing the at least one attribute associated with the email with the user-defined attributes; and
      generating the customized audio alert on the communication device based on the comparing.

2. The method as claimed in claim 1 further comprises including the user-defined attributes to a list of system defined attributes.

3. The method as claimed in claim 1, wherein the at least one attribute includes one of sender address, sender name, subject, attachments, and text in subject and body of the email.

4. The method as claimed in claim 1, wherein the method further comprises re-generating the customized audio alert on the communication device when the customized audio alert is not acknowledged by user, wherein volume of the regenerated customized audio alert is higher than that of a previously generated customized audio alert.

5. An audio alert system comprising:
   a processor; and
   a memory coupled to the processor, the memory comprising:
      an attribute module configured to,
         allow a user to define one or more attributes for emails;
         identify receiving of an email on a communication device, wherein the email is associated with at least one attribute; and
      an alert generation module configured to,
         when an email application state in the communication device is active,
            generate a visual notification on the communication device, wherein the visual notification includes a text depicting email information;
            compare the at least one attribute associated with the email with the one or more user-defined attributes; and
            generate a customized audio alert on the communication device based on the comparing, and
         when the email application state in the communication device is inactive,
            compare the at least one attribute associated with the email with the one or more user-defined attributes; and
            generate the customized audio alert on the communication device based on the comparing.

6. The system as claimed in claim 5, wherein a volume of the customized audio alert is based on ambient noise.

7. The system as claimed in claim 5, wherein the alert generation module is configured to generate the customized audio alert at all volume settings of the communication device.

8. The system as claimed in claim 5, wherein the alert generation module is configured to regenerate the customized audio alert with an increased volume when the customized audio alert is not acknowledged by the user of the communication device.

9. A non-transitory computer-readable medium having embodied thereon a computer program for executing a method comprising:
   identifying receiving of an email on a communication device, wherein the email is associated with at least one attribute;
   when an email application state in the communication device is active,
      generating a visual notification on the communication device, wherein the visual notification includes a text depicting email information;
      comparing the at least one attribute associated with the event email with user-defined attributes; and
      generating a customized audio alert on the communication device based on the comparing, and
   when the email application state in the communication device is inactive,
      comparing the at least one attribute associated with the email with the user-defined attributes; and
      generating the customized audio alert on the communication device based on the comparing.

10. The method as claimed in claim 9 further comprises including the user-defined attributes to a list of system defined attributes.

11. The method as claimed in claim 9, wherein the at least one attribute includes one of sender address, sender name, subject, attachments, and text in subject and body of the email.

12. The method as claimed in claim 9, wherein the method further comprises re-generating the customized audio alert on the communication device when the customized audio alert is not acknowledged by user, wherein volume of the regenerated customized audio alert is higher than that of a previously generated customized audio alert.

* * * * *